United States Patent
Donabedian et al.

(10) Patent No.: US 9,033,401 B1
(45) Date of Patent: May 19, 2015

(54) EXPANDABLE ROOF PANEL PERIMETER REINFORCEMENT

(71) Applicant: Ford Global Technologies, LLC, Dearborn, MI (US)

(72) Inventors: Edgar Edward Donabedian, Livonia, MI (US); Darrin Neil Wagner, Bloomfield Hills, MI (US); Mark Keller, Birmingham, MI (US); Bruno M. Barthelemy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/336,029

(22) Filed: Jul. 21, 2014

Related U.S. Application Data

(63) Continuation-in-part of application No. 14/220,165, filed on Mar. 20, 2014.

(51) Int. Cl.
*B62D 25/06* (2006.01)
*B62D 27/02* (2006.01)

(52) U.S. Cl.
CPC ............. *B62D 27/026* (2013.01); *B62D 25/06* (2013.01)

(58) Field of Classification Search
USPC .......... 296/181.2, 187, 2, 197.12, 29, 203.02, 296/203.03, 203.04; 156/60
See application file for complete search history.

(56) References Cited

U.S. PATENT DOCUMENTS

| | | | |
|---|---|---|---|
| 4,957,326 A * | 9/1990 | Chiba et al. ................... | 296/210 |
| 7,021,704 B2 * | 4/2006 | Ortega Martinez et al. .. | 296/214 |
| 8,272,683 B2 | 9/2012 | Brown et al. | |
| 8,424,961 B2 | 4/2013 | Carsley et al. | |
| 8,439,434 B2 | 5/2013 | Newberg et al. | |
| 8,567,838 B2 | 10/2013 | Coakley et al. | |
| 2009/0058147 A1 * | 3/2009 | Elbs et al. ..................... | 296/210 |
| 2012/0227887 A1 | 9/2012 | Auchter-Bruening | |
| 2013/0200657 A1 | 8/2013 | Shirai | |
| 2013/0285417 A1 | 10/2013 | Yoshida | |

OTHER PUBLICATIONS

"Aluminum Roof Replacement on the Mitsubishi Lancer Evolution and Outlander," I-CAR Advantage Online, Mar. 31, 2010, 2 pages.

* cited by examiner

*Primary Examiner* — Pinel Romain
(74) *Attorney, Agent, or Firm* — Raymond Coppiellie; Price Heneveld LLP

(57) ABSTRACT

A vehicle roof frame includes an adhering structure having an adhesive carrier and an expanding structural adhesive coupled to at least a portion of an outer surface of the adhesive carrier. The expanding structural adhesive includes an installation state and a structural state, and the structural state has a larger volume than the installation state. The vehicle roof frame also includes a plurality of vehicle frame members that cooperate to form a frame joint and a joint cavity defined within the frame joint. The adhering structure is disposed within the joint cavity and the adhesive carrier and the expanding structural adhesive in the structural state substantially occupies the joint cavity and fixably couples the plurality of framing members such that the frame joint is free of supplemental mechanical connections proximate the joint cavity.

20 Claims, 18 Drawing Sheets

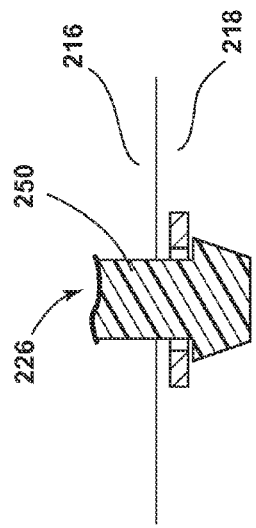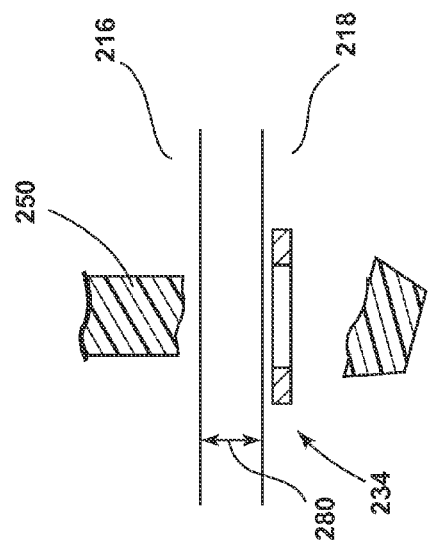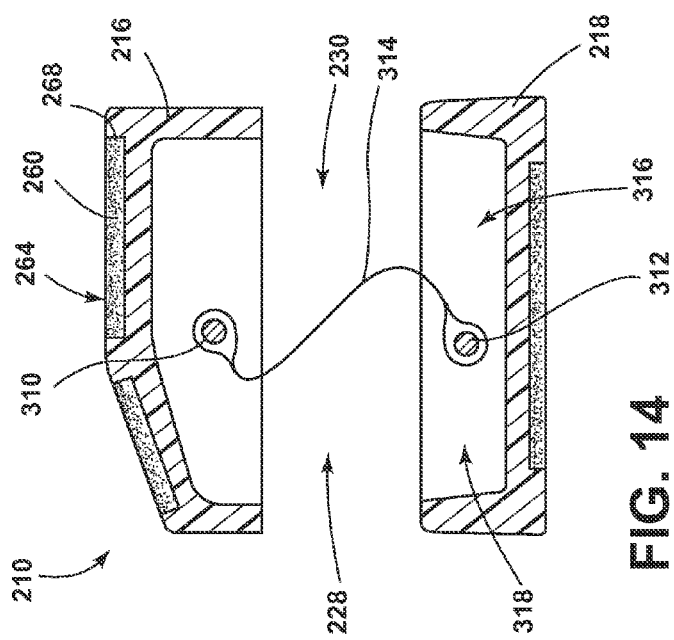

EXPANDABLE ROOF PANEL PERIMETER REINFORCEMENT

CROSS-REFERENCE TO RELATED APPLICATION

This application is a continuation-in-part of U.S. patent application Ser. No. 14/220,165, filed on Mar. 20, 2014, entitled "EXPANDABLE ROOF PANEL PERIMETER REINFORCEMENT," the entire disclosure of which is hereby incorporated herein by reference.

FIELD OF THE INVENTION

The present invention generally relates to a reinforcement for a vehicle frame joint, and more specifically, an expandable perimeter reinforcement for vehicle joints including roof panel joints.

BACKGROUND OF THE INVENTION

Typically, as vehicle frames are constructed, certain portions of the frame are difficult to reach or access in order to perform various welding functions to fully reinforce the vehicle frame. These accessibility limitations can affect the efficiency in which a vehicle frame is constructed. Additionally, in various vehicles that require enhanced reinforcement, the issues of accessibility of welding mechanisms can be exacerbated, such that design choices for where to weld the various framing members can be very limited.

SUMMARY OF THE INVENTION

According to one aspect of the present invention, a vehicle roof frame includes an adhering structure having an adhesive carrier and an expanding structural adhesive coupled to at least a portion of an outer surface of the adhesive carrier. The expanding structural adhesive includes an installation state and a structural state, and the structural state has a larger volume than the installation state. The vehicle roof frame also includes a plurality of vehicle frame members that cooperate to form a frame joint and a frame joint defined within the frame joint. The adhering structure is disposed within the joint cavity and the adhesive carrier and the expanding structural adhesive in the structural state substantially occupies the frame cavity and fixably couples the plurality of frame members such that the frame joint is free of supplemental mechanical connections proximate the joint cavity.

According to another aspect of the present invention, a vehicle joint frame includes a plurality of vehicle frame members at least partially defining a joint cavity, an adhesive carrier disposed in the joint cavity and an expanding structural adhesive disposed on an outer surface of the adhesive carrier and fixedly coupling the plurality of vehicle frame members. The adhesive carrier and the expanding structural adhesive substantially fill the joint cavity.

According to another aspect of the present invention, a method of forming a vehicle frame joint includes the steps of forming an adhering structure having an adhesive carrier and an expanding structural adhesive disposed on at least a portion of an outer surface of the adhesive carrier, wherein the expanding structural adhesive is in a contracted state, placing a plurality of vehicle frame members to cooperatively form a frame joint and a joint cavity defined within the frame joint, placing the adhering structure within the joint cavity, wherein the adhering structure is capable of limited movement when the expanding structural adhesive in is the contracted state and curing the adhesive layer. The method further includes the step of curing the expanding structural adhesive to expand to a structural state and substantially fill the joint cavity and form a substantially fixed connection between the plurality of vehicle frame members. The substantially fixed connection is free of supplemental mechanical connections proximate the joint cavity.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 14 is a cross-sectional view of the two-piece expandable reinforcement of FIG. 13 taken along line XIV-XIV showing the supplemental tether of the two-piece expandable reinforcement;

FIG. 15 is a detail cross-sectional view of the two-piece expandable reinforcement of FIG. 13 taken along line XV-XV showing the primary connecting mechanism in the directly-engaged position;

FIG. 16 is a detail cross-sectional view of the two-piece expandable reinforcement of FIG. 15 with the primary connection mechanism in the distally-engaged position;

DETAILED DESCRIPTION OF THE PREFERRED EMBODIMENTS

Figure 1:
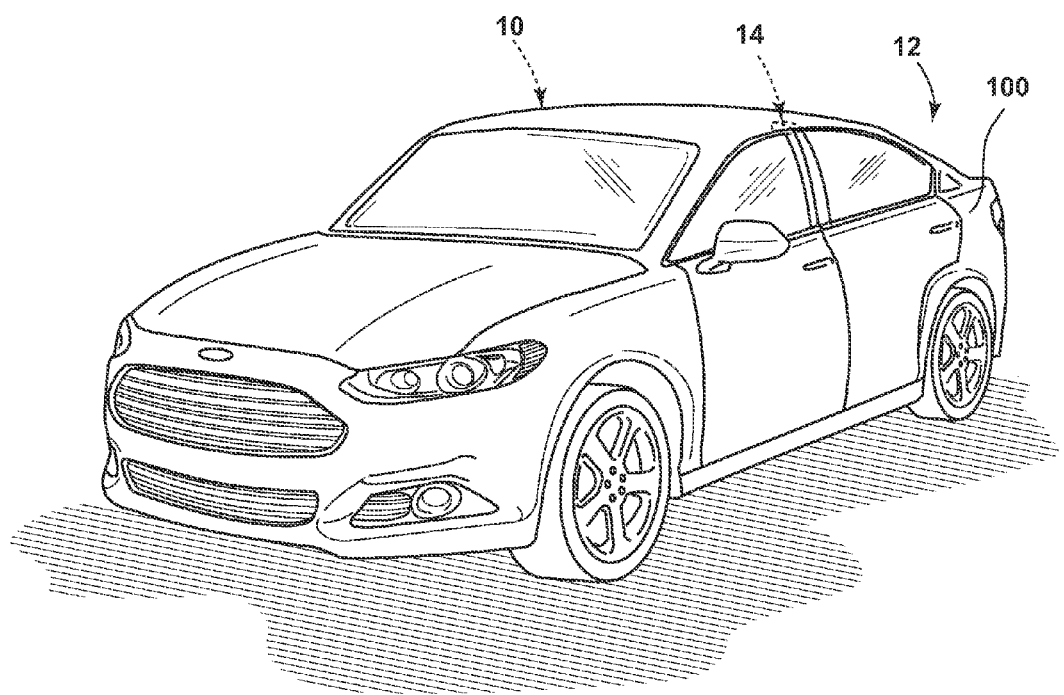
FIG. 1 is a front side perspective view of a vehicle with an embodiment of the expandable reinforcement installed therein.
Figure 2:
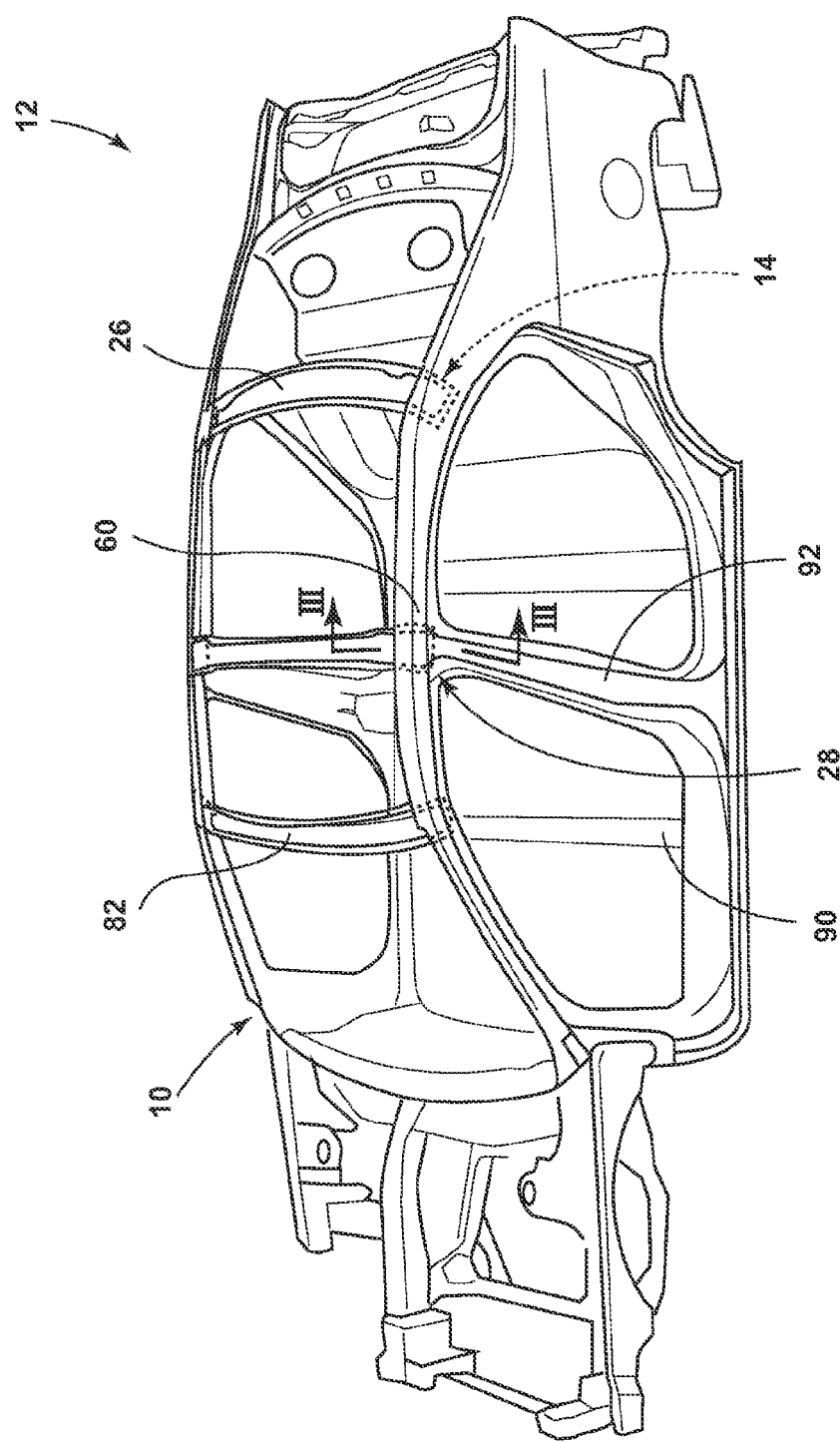
FIG. 2 is a top perspective view of a vehicle frame with an alternative embodiment of the expandable reinforcement installed therein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a frame installed within a vehicle, wherein the frame 10 includes an adhering structure 14 having an adhesive carrier 16 and an expanding structural adhesive 18 coupled to at least a portion of an outer surface 20 of the adhesive carrier 16. The expanding structural adhesive 18 includes a contracted installation state 22 and an expanded structural state 24, wherein the structural state 24 includes a larger volume of the installation state 22. A plurality of vehicle frame members 26 cooperate to form a frame joint 28 and a joint cavity 30 defined within the frame joint 28. The adhering structure 14 is disposed within the joint cavity 30, wherein the adhesive carrier 16 and the expanding structural adhesive 18, in the structural state 24, substantially occupies the joint cavity 30 and fixedly couples the plurality of frame members 26 such that the frame joint 28 is free of supplemental mechanical connections proximate the joint cavity 30.

Figure 3:
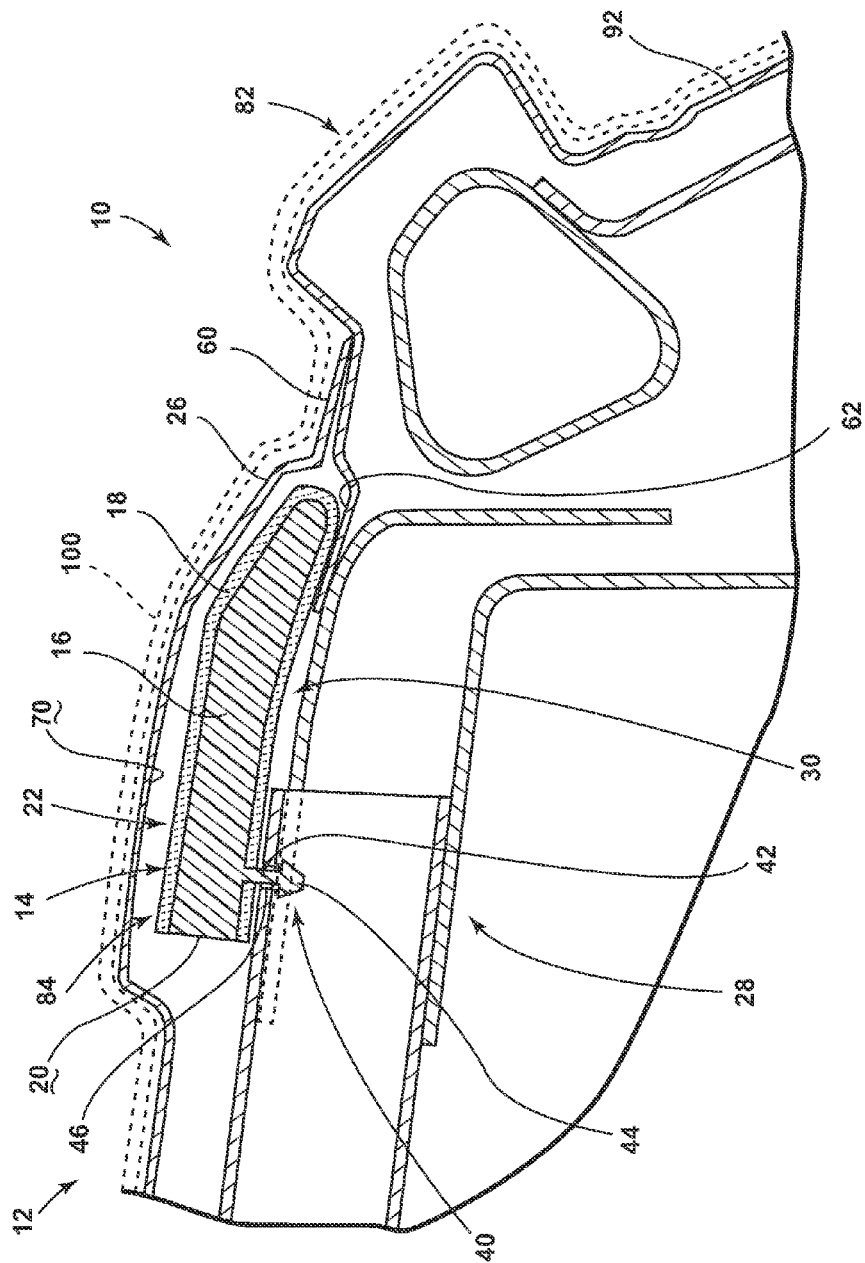
FIG. 3 is a cross-sectional view of the vehicle frame of FIG. 2 taken at line III-III with the expandable reinforcement in an installation state.
Figure 4:
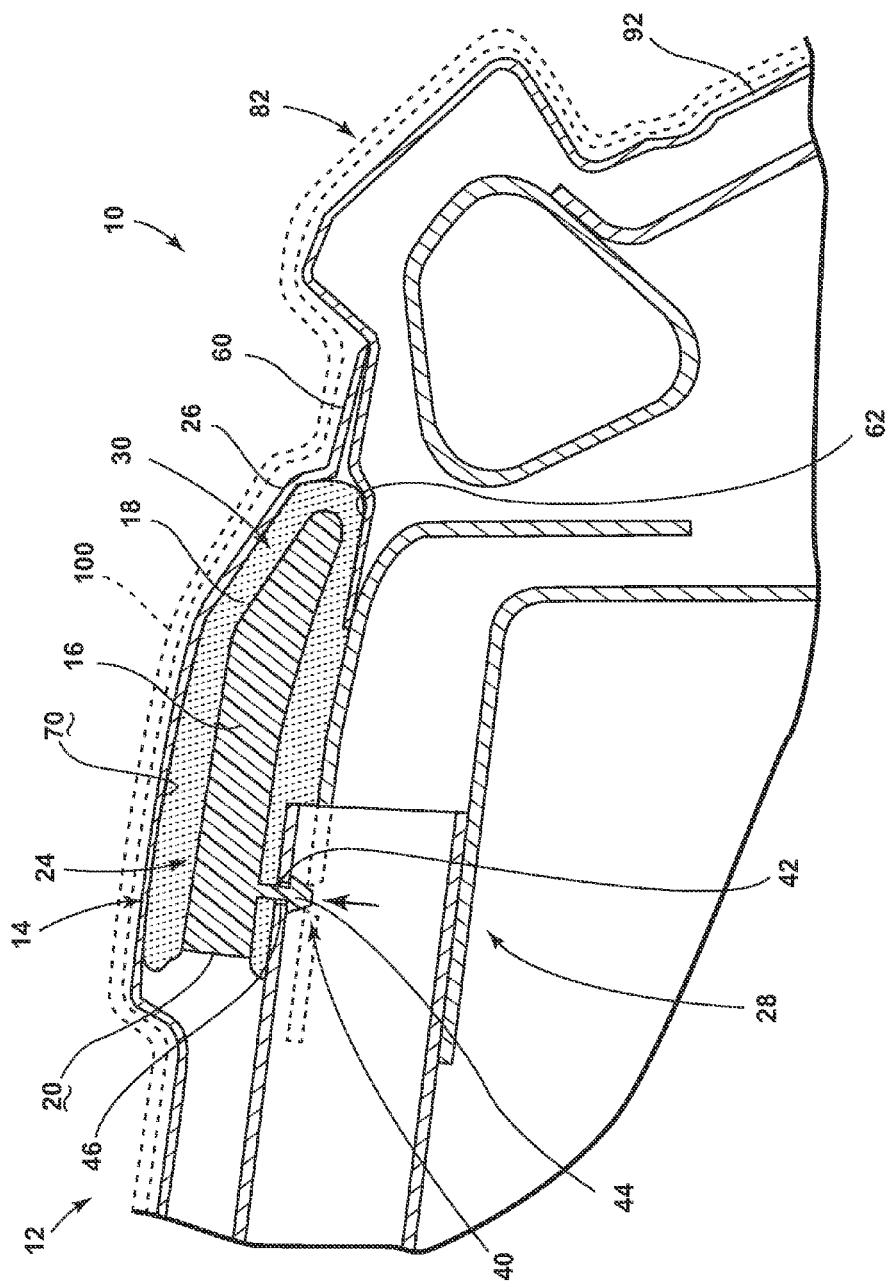
FIG. 4 is a cross-sectional view of the vehicle of FIG. 3 with the expandable reinforcement in a structural state.
Figure 5:
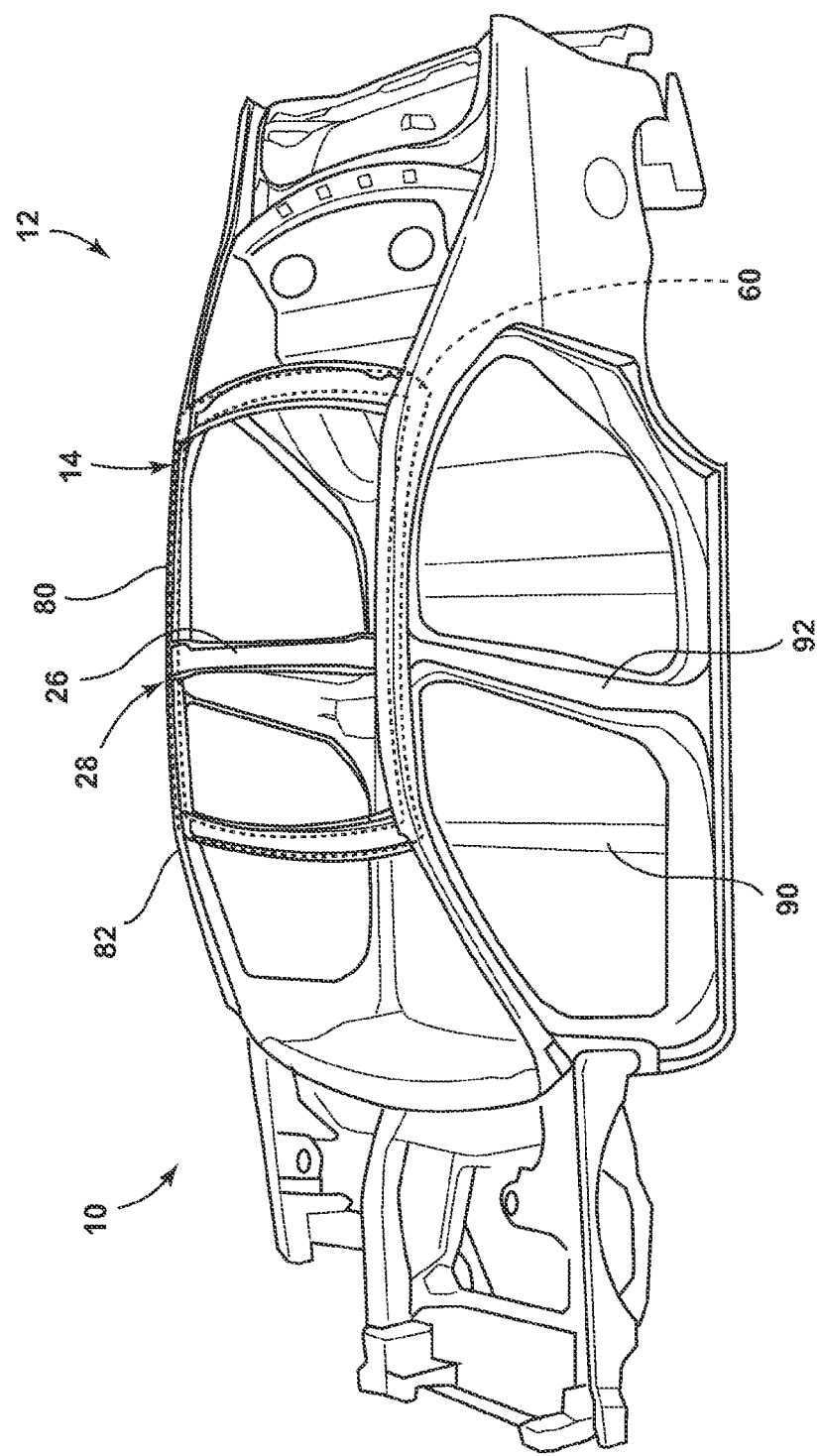
FIG. 5 is a perspective view of a vehicle frame with another alternative embodiment of the expandable reinforcement installed therein.

Referring now to FIGS. 3 and 4, the adhesive carrier 16 can include an integral attachment clip 40 that engages at least one of the vehicle frame members 26 of the frame 10 of the vehicle 12. In the various embodiments, the attachment clip 40 includes a post 42 that extends from the outer surface 20 of the adhesive carrier 16 and extends to a retaining feature 44 disposed at the opposing end of the post 42. At least one of the plurality of frame members 26 includes a clip receptacle 46 for receiving and securing the retaining feature 44 of the attachment clip 40. In this manner, the post 42 of the attachment clip 40 is slidably engaged within the clip receptacle 46, such that the adhering structure 14 is allowed limited movement within the joint cavity 30 when the attachment clip 40 is secured within the clip receptacle 46. The expanding structural adhesive 18 is in the installation state 22. In this manner, when the adhering structure 14 is disposed within the joint cavity 30, the adhering structure 14 can be shifted and moved within the joint cavity 30 to ensure proper alignment of the adhering structure 14 within the joint cavity 30.

In the various embodiments, it is also contemplated that the attachment clip 40 is integrally formed as part of the adhesive carrier 16. It is also contemplated that the attachment clip 40 can be a separate piece that is attached to the adhesive carrier 16 by welding, mechanically fastening, adhering or otherwise connecting the attachment clip 40 to a predetermined portion of the adhesive carrier 16. It is further contemplated that the retaining feature 44 and the post 42 can be integrally formed. In such an embodiment, portions of the retaining feature 44 can be substantially flexible to allow the retaining feature 44 to pass through the clip receptacle 46 and be substantially retained therein. The retaining feature 44 and the clip receptacle 46 can also be cooperatively formed such that the retaining feature 44 and the clip receptacle 46 include tabs, protrusions, recesses or other similar forms. These forms allow the retaining feature 44 to pass through the clip receptacle 46 in a predetermined configuration, but not be removed when the adhering structure 14 is placed in the final position within the joint cavity 30. In various embodiments, it is contemplated that where the attachment clip 40 is a separate piece that can be attached to the adhesive carrier 16, the attachment clip 40 can be inserted through the clip receptacle 46, opposite the adhesive carrier 16, and attached to the adhesive carrier 16 positioned in the joint cavity 30. In this manner, the connection of the attachment clip 40, through the clip receptacle 46, and to the adhesive carrier 16 serves to substantially position the adhering structure 14 in the predetermined position before being cured.

Referring again to FIGS. 3 and 4, as the expanding structural adhesive 18 is cured, as will be described more fully below, the expansion of the expanding structural adhesive 18 moves the adhering structure 14 within the joint cavity 30. As the adhering structure 14 moves within the joint cavity 30 during the expansion of the expanding structural adhesive 18, the engagement between the attachment clip 40 and the clip receptacle 46 of the vehicle frame 10 is configured to guide the movement of the adhering structure 14 within the joint cavity 30 to substantially insure proper alignment of the adhering structure 14 within the joint cavity 30. Accordingly, the various frame members 26 of the vehicle frame 10 are joined together through the use of the adhering structure 14 without the need for individual welding between the members at points within the joint cavity 30, which may be difficult for various welding apparatus to reach. It is contemplated that exterior portions 60 of the various frame members 26 can be welded through spot welding, laser welding, and other welding operations. However, in certain vehicles, it is necessary to provide additional structural reinforcement through structural connections that are disposed on interior portions 62 and exterior portions 60 of the various frame joints 28. In this manner, the adhering structure 14 substantially minimizes the need for complex welding operations and mechanisms in order to provide this additional reinforcement upon interior portions 62 of the frame joint 28 proximate the joint cavity 30. In this manner, the adhering structure 14 being placed within the joint cavity 30 and the expanding structural adhesive 18 being bonded to the frame joint 28 can eliminate the need for supplemental mechanical connections within the joint cavity 30. Such supplemental mechanical connections can include, but are not limited to, welds, nut and bolts connections, rivets, screws, hooks, pins, combinations thereof, and other similar mechanical connections.

Referring again to FIGS. 3 and 4, the expanding structural adhesive 18 is cured during one of several curing processes that can include, but are not limited to, an electrocoat cure for various portions of the vehicle frame members 26, an independent curing cycle dedicated to the expanding structural adhesive 18, or other curing period for portions of the vehicle frame 10. It is also contemplated that the cure for the expanding structural adhesive 18 is included as a portion of a multi-part cure of one or more portions of the vehicle frame 10. As the cure takes place, the expanding structural adhesive 18 is exposed to heat, wherein the heat serves to activate the expanding structural adhesive 18. Once activated, the expanding structural adhesive 18 increases in volume and changes to have adhesive properties. The adhesive properties of the expanding structural adhesive 18 experienced during the cure allow the expanding structural adhesive 18 to fill the joint cavity 30 and engage and adhere to the inner surface 70 of the joint cavity 30.

Referring now to FIGS. 2-5, it is contemplated that the adhering structure 14 can be disposed at localized areas within the vehicle frame 10, such that minimally sized adhering structures 14 are disposed at specific frame joints 28 of the frame 10 of the vehicle 12. It is contemplated that the embodiments of the adhering structure 14 can be used in areas within certain linear portions of the frame 10 of the vehicle 12, such as linear members of the frame 10 that extend between certain frame joints 28. By way of explanation, and not limitation, the adhering structure 14 can be positioned upon or within the frame 10 at linear portions extending between two frame joints 28 of the roof frame 82. In various alternate embodiments, it is contemplated that the adhering structure 14 can extend substantially around a perimeter 80 of the frame 10 of the vehicle 12, such as around the perimeter 80 of the roof frame 82 of the vehicle 12. Regardless of the size and configuration of the adhering structure 14, the expanding structural adhesive 18, when in the structural state 24, is configured to substantially fill the interstitial space 84 within the joint cavity 30 that is defined by the plurality of frame members 26 and the adhesive carrier 16.

In the various embodiments, the adhesive carrier 16 of the adhering structure 14 is sized such that when the expanding structural adhesive 18 is disposed on the outer surface 20 of the adhesive carrier 16, and the expanding structural adhesive 18 is in the contracted state, the adhering structure 14 is at least slightly smaller than the interstitial space 84 defined between the inner surface 70 of the joint cavity 30 and the adhesive carrier 16. The adhesive carrier 16 is further sized such that the expanding structural adhesive 18, when cured, is configured to expand a sufficient distance away from the adhesive carrier 16 to substantially fill the interstitial space 84 of the joint cavity 30 between the adhesive carrier 16 and the various vehicle frame members 26 that define the joint cavity 28 of the frame 10. The size of the adhesive carrier 16 and the amount and/or thickness of the expanding structural adhesive 18 can vary depending on several factors that include, but are not limited to, the configuration of the frame joint 28 and the joint cavity 30, the type of expanding structural adhesive 18, the temperature and duration of the cure, the desired strength of the frame joint 28, the material of the frame members 26 and the adhesive carrier 16, among others.

Referring again to FIGS. 1-5, the expanding structural adhesive 18 can include various bonding agents that can include, but are not limited to, epoxy, acrylic, urethane, anaerobic adhesives, multi-part adhesives, film-type adhesives, fluid-type adhesives and other various adhesives that expand to form a structural bond. It is contemplated that the expanding structural adhesive 18 is bonded to various frame members 26 that can include, but are not limited to, roof frame members, floor frame members, pillar members, and various other frame members within the vehicle 12 and frame 10. These various frame members 26 can be made of various materials that can include, but are not limited to, aluminum, aluminum alloys, composite, steel, combinations thereof, and other various vehicle framing materials 26. The adhesive carrier 16 of the adhering structure 14 that receives the expanding structural adhesive 18 in the installation state 22 can be made of various materials that can include, but are not limited to, aluminum, aluminum alloys, steel, steel alloys, composite, plastic, rubber, one or more polymers and other various substantially rigid materials. It is further contemplated that the adhesive carrier 16 can be an extrudable material wherein the adhesive carrier 16 can be extruded to the exact dimensions necessary for installation within the joint cavity 30. It is also contemplated that the adhesive carrier 16 and the expanding structural adhesive 18 can be a co-extruded system wherein the adhesive carrier 16 and the expanding structural adhesive 18 are extruded as a single unit and substantially dimensioned for installations in the various applications within the vehicle frame 10.

As illustrated in FIGS. 1-5, it is contemplated that the adhering structure 14 can be used to form a structural attachment between certain body panels 100, retain body panels 100 to portions of the frame 10, or other similar structural connections within the vehicle 12. Additionally, while the adhering structure 14 can be used in locations of the vehicle 12 that may be difficult for placing mechanical fasteners or welds, the adhering structure 14 can also be used instead of or in addition to welds or mechanical fasteners, even in conditions where accessing the connection point is not difficult.

Having described the general structure and configuration of the adhering structure 14, including the adhesive carrier 16 and the expanding structural adhesive 18, a method 600 for forming a vehicle frame connection is described herein for incorporating the adhering structure 14 within the frame 10 of a vehicle frame connection for providing a structural connection between various frame members 26 within a joint cavity 30 defined by the connection between the various frame members 26. According to the method 600, one step includes forming an adhering structure 14 having an adhesive carrier 16 and an expanding structural adhesive 18 disposed on at least a portion of an outer surface 20 of the adhesive carrier 16, and wherein the expanding structural adhesive 18 is in a contracted state (step 602). Another step in the method includes placing a plurality of vehicle frame members 26 in a pre-determined configuration to cooperatively form a frame joint 28 and a joint cavity 30 defined within the frame joint 28 (step 604). The adhering structure 14 is then placed within the joint cavity 30, wherein the adhering structure 14 is capable of limited movement within the joint cavity 30 when the expanding structural adhesive 18 is in the contracted state (step 606).

Figure 6:
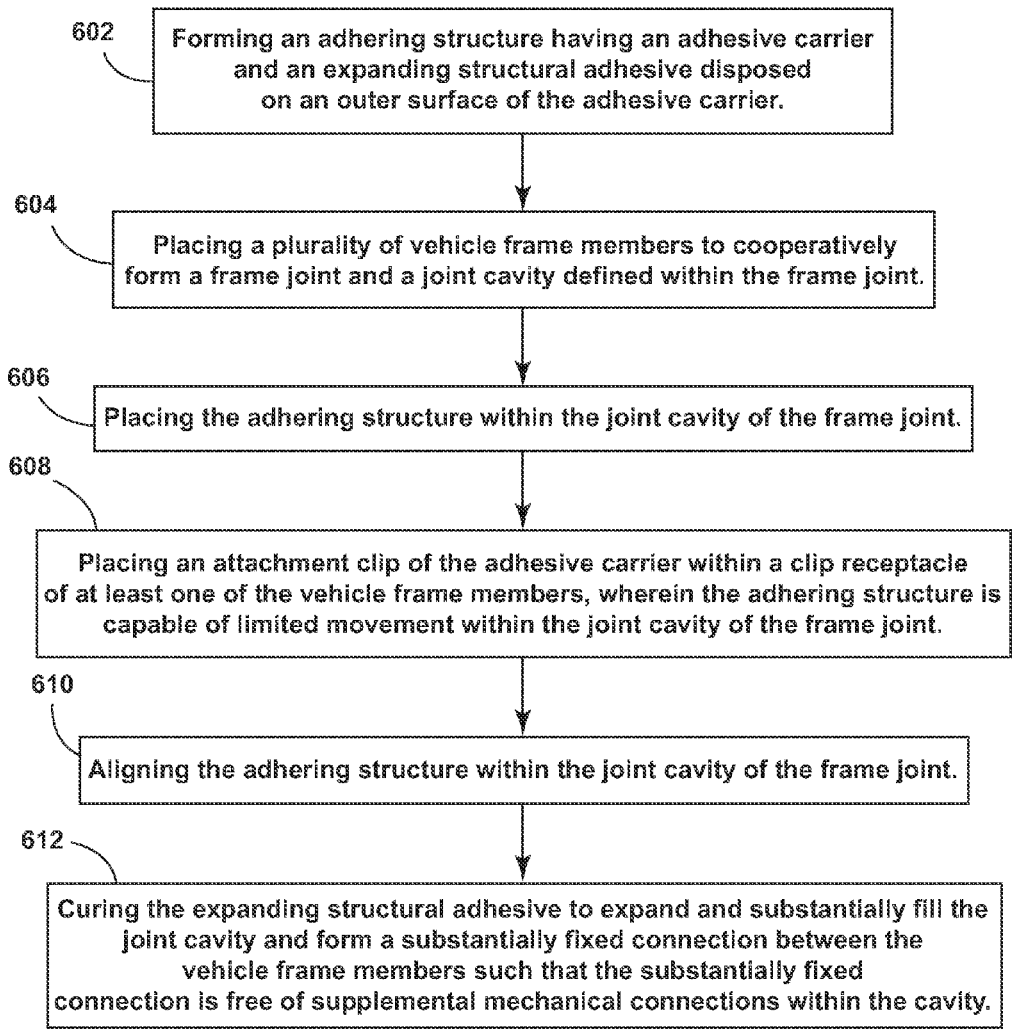
FIG. 6 is a schematic flow diagram illustrating a method for forming a vehicle frame connection using an expandable reinforcement within a vehicle frame.
Figure 7:
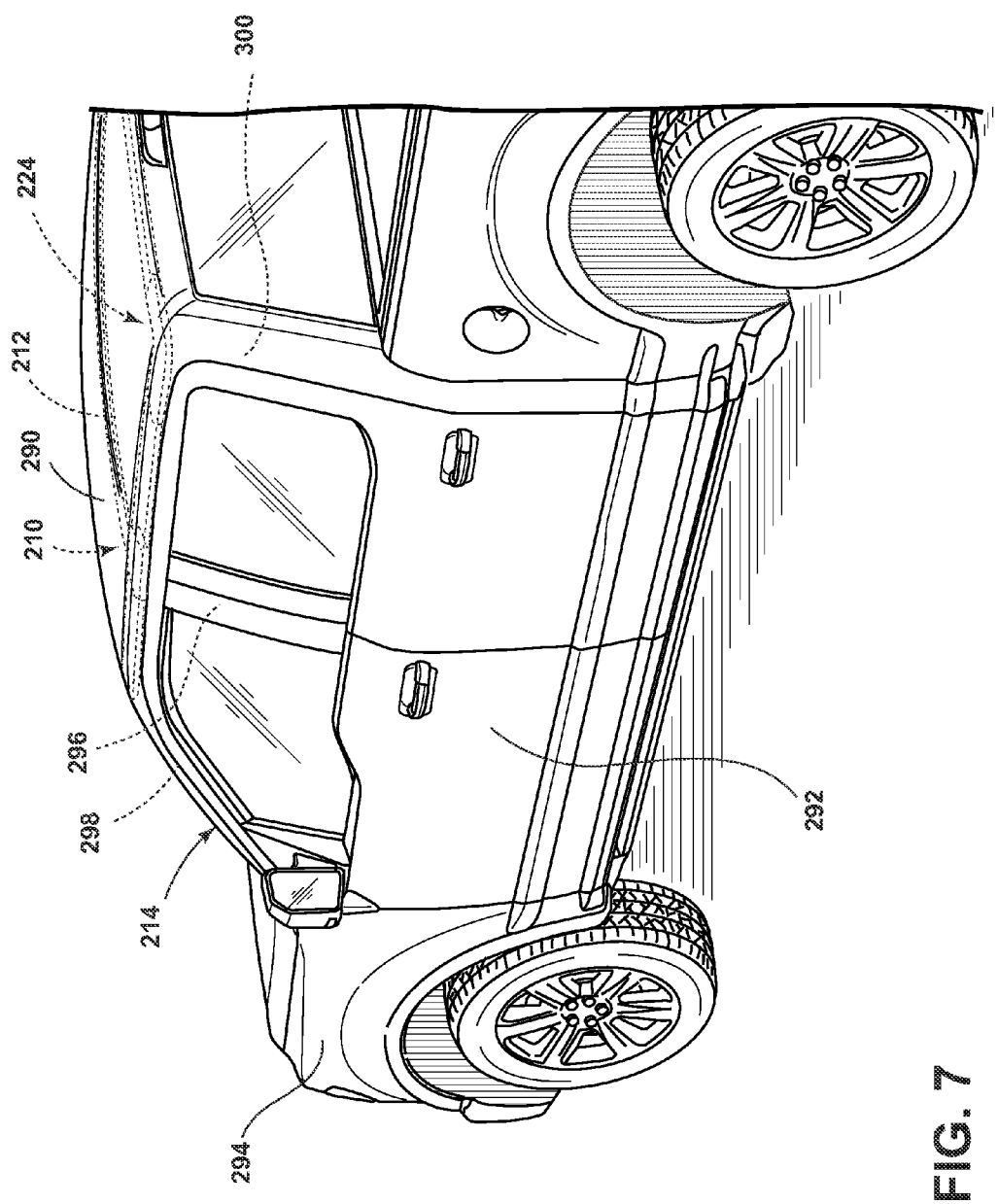
FIG. 7 is a rear side perspective view of a vehicle with an alternate embodiment of the two-piece expandable reinforcement installed therein.
Figure 8:
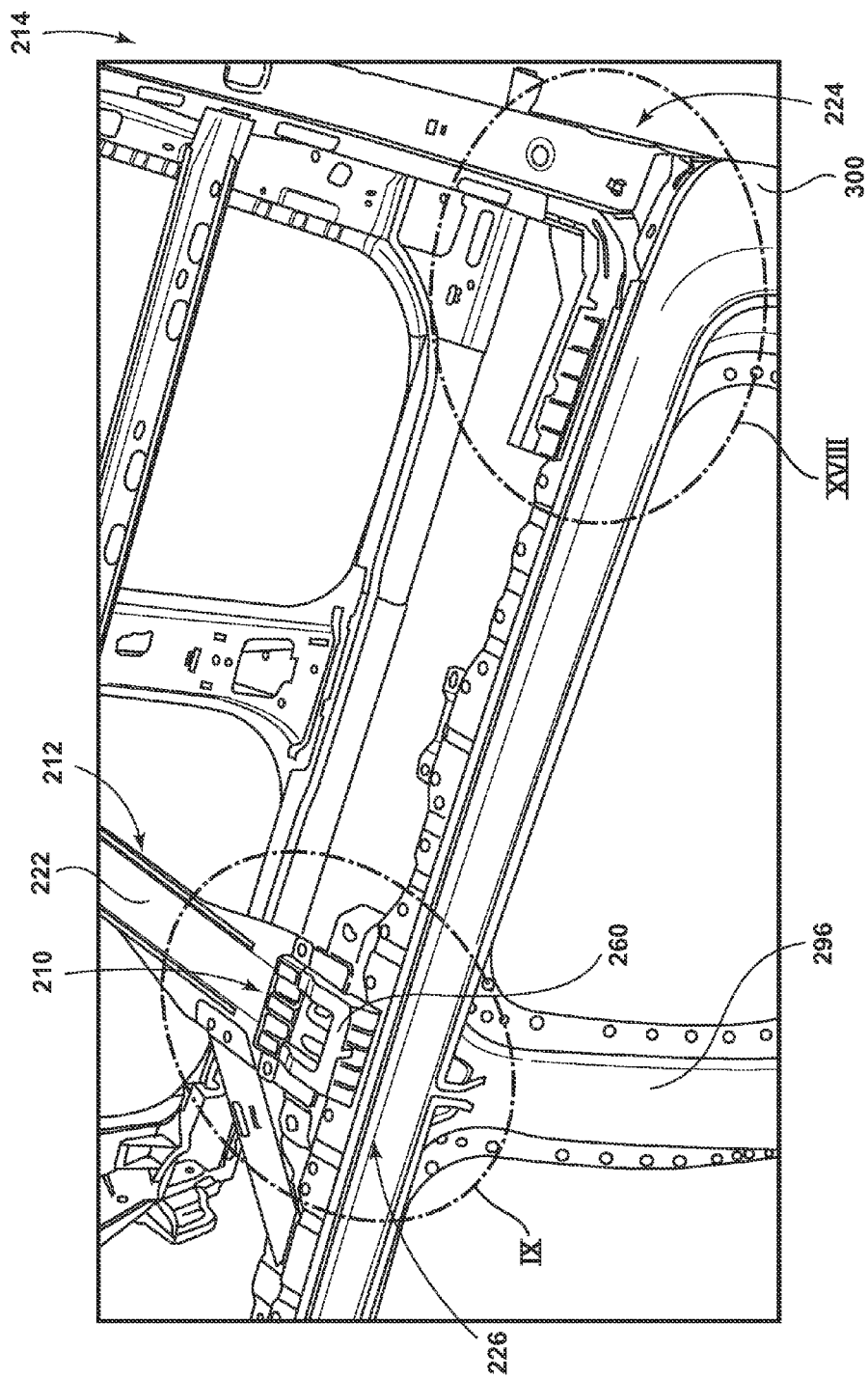
FIG. 8 is a top perspective view of a vehicle frame with another alternative embodiment of the two-piece expandable reinforcement installed therein.
Figure 9:
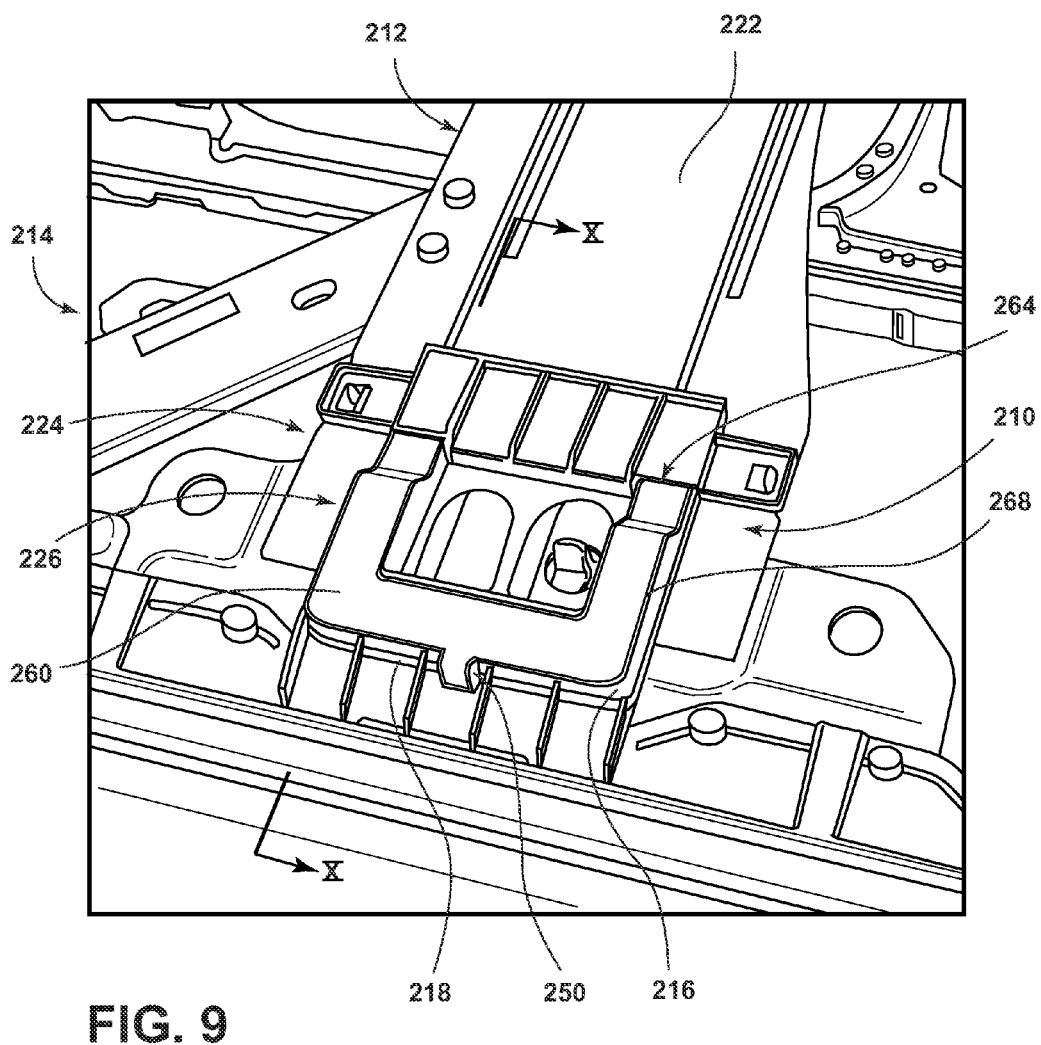
FIG. 9 is an enlarged top perspective view of the two-piece expandable reinforcement of FIG. 8 taken at area IX.

Referring again to FIG. 6, according to various embodiments of the method, the adhesive carrier 16 can include an integral attachment clip 40 that engages at least one of the plurality of vehicle frame members 26. In such embodiments, the attachment clip 40 includes a post 42 that extends from a surface of the adhesive carrier 16 and includes a retaining feature 44 at the opposing end of the post 42. As the adhering structure 14 is disposed within the joint cavity 30, the retaining feature 44 is disposed within a receptacle defined within one or more of the vehicle frame members 26, wherein the retaining feature 44 is substantially secured within the clip receptacle 46 (step 608). Once the adhering structure 14 is disposed within the joint cavity 30, the adhering structure 14 is configured such that the post 42 is afforded some limited movement within the clip receptacle 46. During performance of the method, the adhering structure 14 can be manipulated within the joint cavity 30 to insure proper alignment of the adhering structure 14 within the cavity (step 610). Additionally, the limited movement afforded to the adhering structure 14 within the cavity allows the adhering structure 14 to move during curing of the expanding structural adhesive 18, such that the expanding structural adhesive 18 can be evenly adhered throughout the inner surface 70 of the joint cavity 30.

Referring again to FIG. 6, another step in the method 600 includes curing the expanding structural adhesive 18, such that the expanding structural adhesive 18 expands to a structural state 24 (step 612). When in the structural state 24, the expanding structural adhesive 18 substantially fills the joint cavity 30 and forms a substantially fixed connection between the plurality of vehicle frame members 26. In this manner, the plurality of vehicle frame members 26 can be attached at the joint cavity 30 without the need for additional mechanical connections or welds within the joint cavity 30.

Referring now to FIGS. 7-18, which include separate reference numbers, except where indicated, the reference numeral 210 generally refers to an alternative embodiment of a two-piece expandable reinforcement for the frame 212 of a vehicle 214. The two-piece expandable reinforcement 210 includes first and second adhering structures 216, 218 that are adhered to first and second members 220, 222 of a frame joint 224, respectively. The first and second adhering structures 216, 218 are selectively connected together to define a directly-engaged position 226. A supplemental tether 228 extends between the first and second adhering structures 216, 218 and defines a slack position 230 when the first and second adhering structures 216, 218 are in the directly-engaged position 226. When a predetermined impact force 232 is applied to the frame joint 224, the first adhering structure 216 and the first member 220 at least partially separate from the second adhering structure 218 and the second member 222 and move toward a predetermined distally-engaged position 234. The supplemental tether 228 defines a tensioned position 236 when the first and second adhering structures 216, 218 are disposed in the distally-engaged position 234. In the various embodiments, it is contemplated that the supplemental tether 228 can define a plurality of partially-extended positions as the first and second adhering structures 216, 218 moved toward the distally-engaged position 234.

Referring again to FIGS. 9-16, the two-piece expandable reinforcement 210 can include a primary connecting mechanism 250 that is adapted to selectively retain the first and second adhering structures 216, 218 in the directly-engaged position 226. In this manner, the predetermined impact force 232 serves to cause the primary connecting mechanism 250 to disengage, detach or otherwise fail, to allow the first and second adhering structures 216, 218 to move from the directly-engaged position 226 toward the distally-engaged position 234.

Referring again to FIGS. 7-10, the two-piece expandable reinforcement 210 includes the first and second adhering structures 216, 218 that act as carriers for the expanding structural adhesive 260. During formation of the vehicle frame 212, the two-piece expandable reinforcement 210 is placed within the cavity 262 defined by the first and second members 220, 222, as well as other members, of the frame joint 224. Once disposed within the cavity 262, and after one or more painting processes have been completed, the vehicle frame 212 is placed through a paint cure process that cures various painted layers upon the vehicle frame 212 and also cures the expanding structural adhesive 260 disposed within each of the first and second adhering structures 216, 218. In this manner, the expanding structural adhesive 260 is modified from the installation state 264 to the structural state 266 as a result of the curing process. As the expanding structural adhesive 260 expands within the cavity 262, the first and second adhering structures 216, 218 are adhered to the first and second members 220, 222, respectively.

Figure 10:
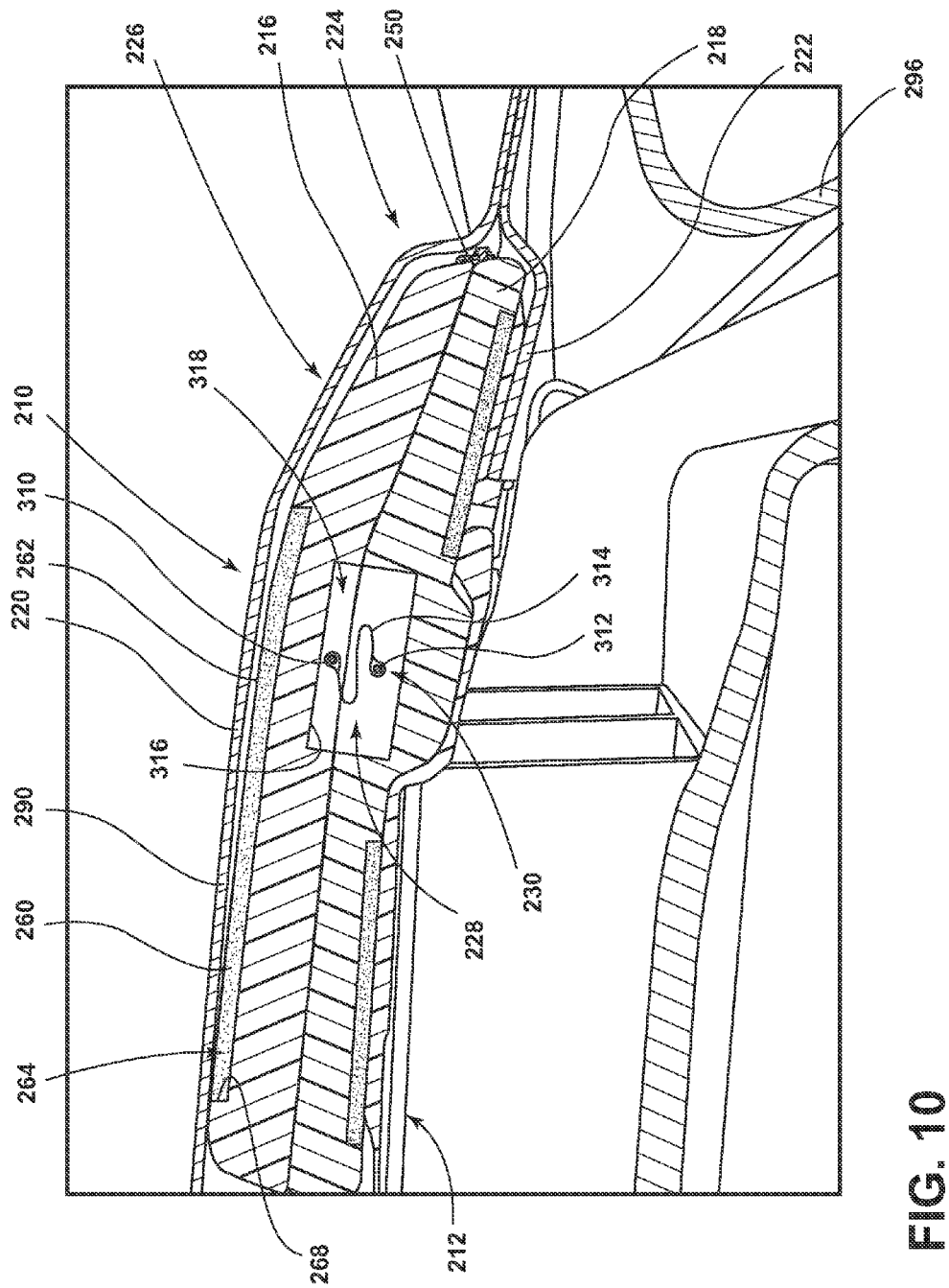
FIG. 10 is a cross-sectional view of the two-piece expandable reinforcement of FIG. 9 taken along line X-X with the expandable structural adhesive in the installation state and the two-piece expandable reinforcement in the directly-engaged position.
Figure 11:
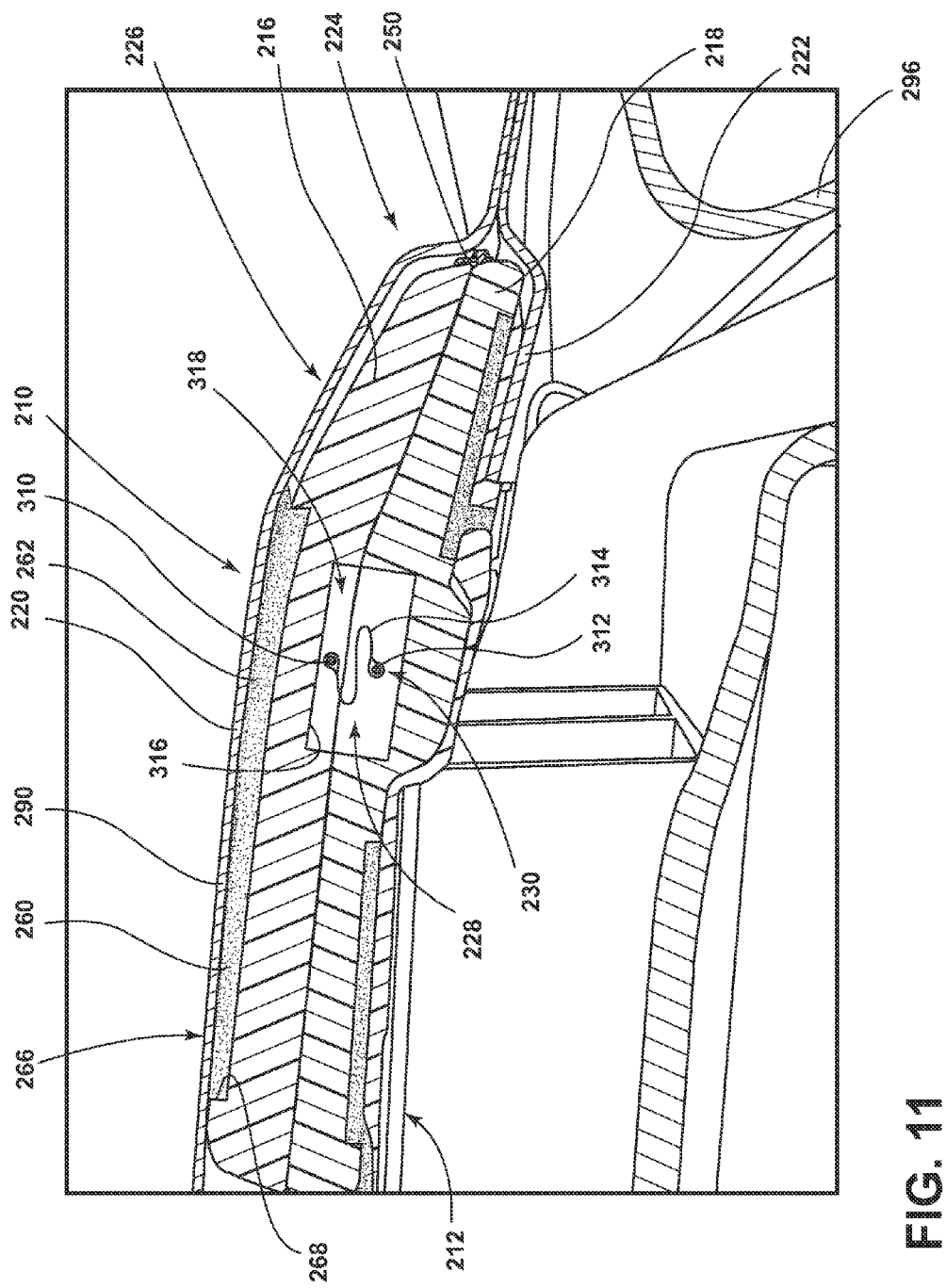
FIG. 11 is a cross-sectional view of the two-piece expandable reinforcement of FIG. 10 with the expandable structural adhesive in the structural state.
Figure 12:
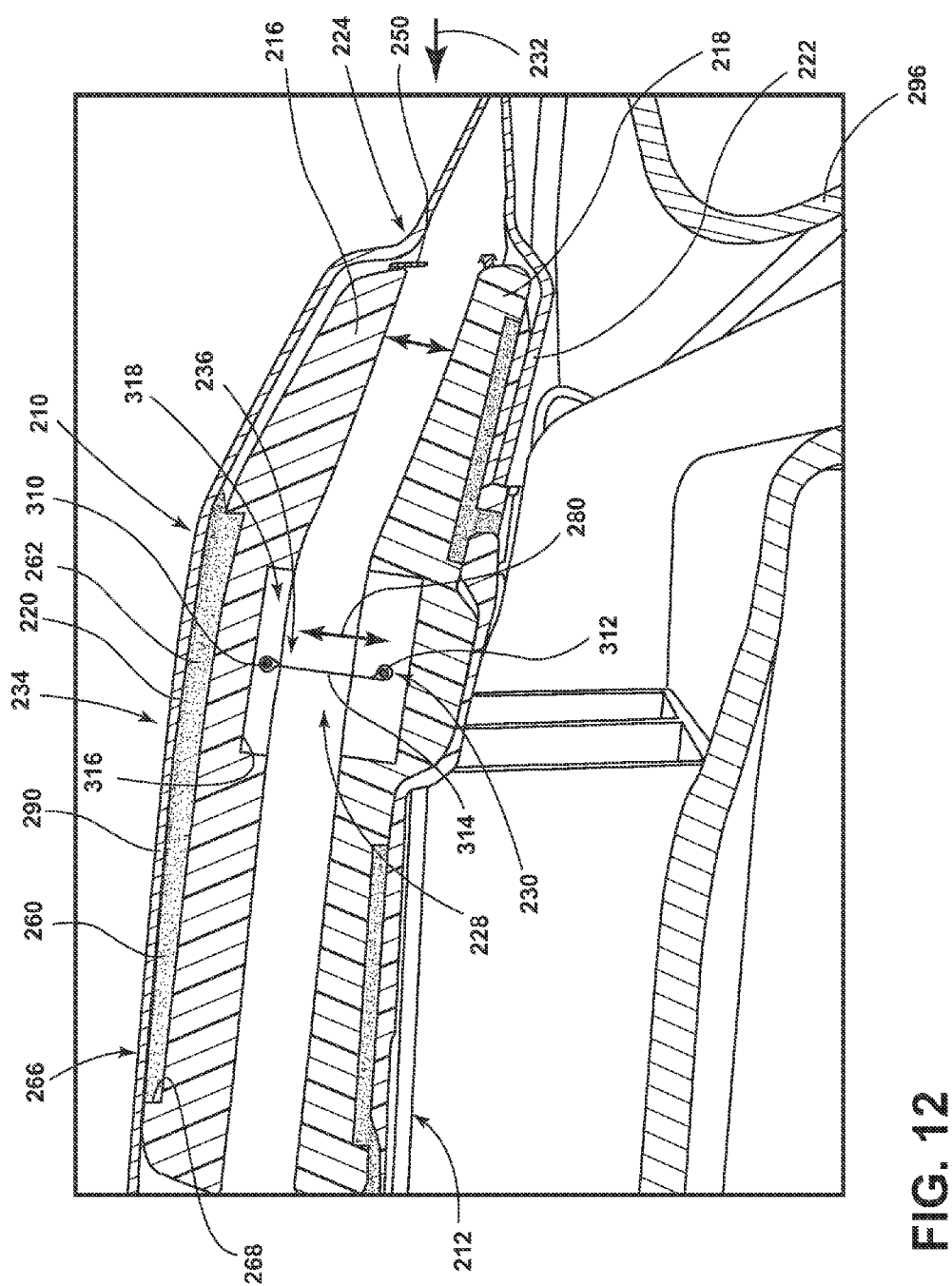
FIG. 12 is a cross-sectional view of the two-piece expandable reinforcement of FIG. 11 with the two-piece expandable reinforcement in the distally-engaged position.
Figure 13:
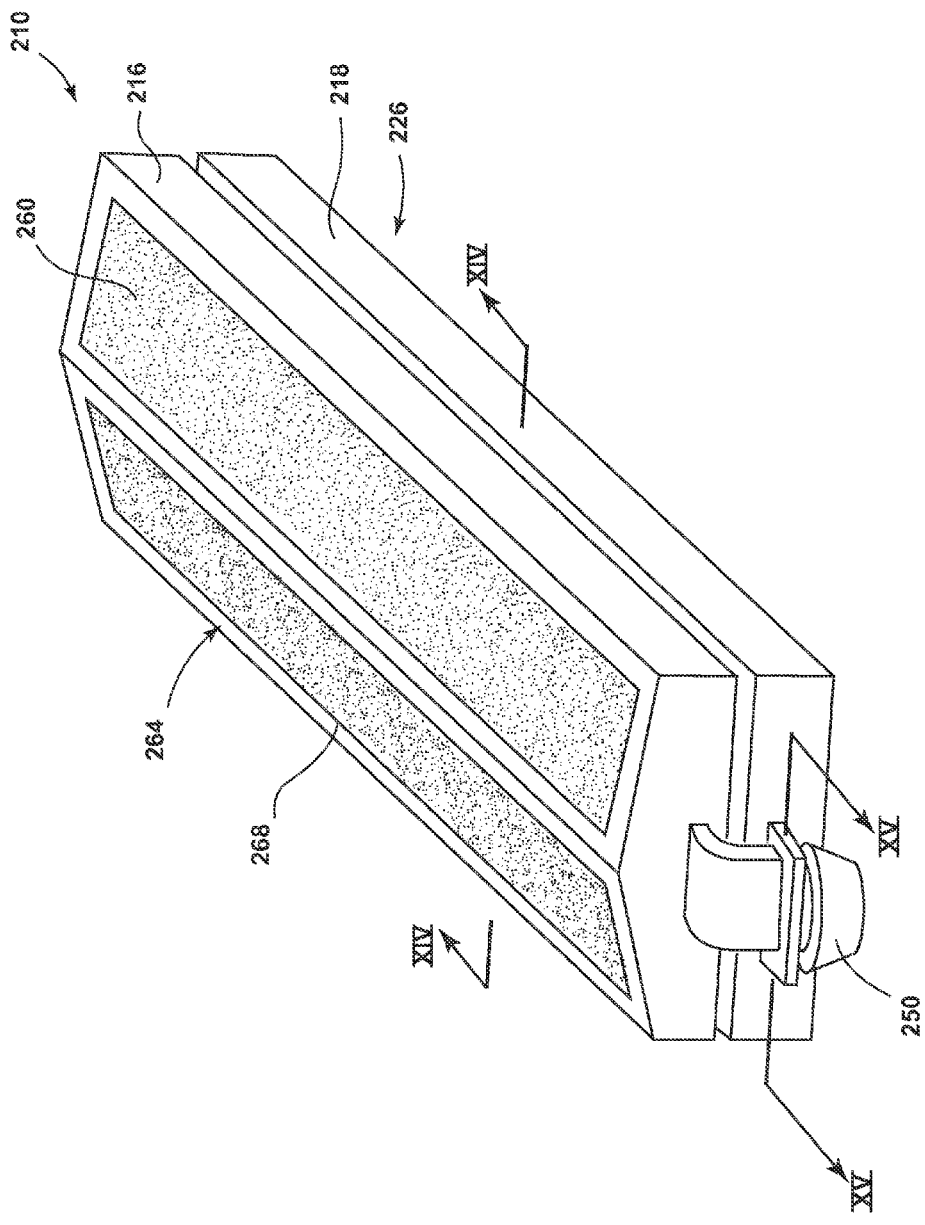
FIG. 13 is a schematic perspective view of another alternative embodiment of the two-piece expandable reinforcement.

As illustrated in FIGS. 10-12, it is contemplated that each of the first and second adhering structures 216, 218 includes at least one recess 268 that is adapted to receive the expanding structural adhesive 260. It is also contemplated that each of the first and second adhering structures 216, 218 and the expanding structural adhesive 260 can be co-extruded or co-molded to form each of the first and second adhering structures 216, 218 of the two-piece expandable reinforcement 210. When the expandable structural adhesive is in the installation state 264, prior to being cured, the expandable structural adhesive can be substantially rigid, such that it can be extruded as part of the first and second adhering structures 216, 218.

In various embodiments, the expandable structural adhesive can be a formable material that can be compressed, injected, blown or otherwise formed as part of the first and second adhering structures 216, 218. In such an embodiment, the first and second adhering structures 216, 218 and the expandable structural adhesive can be molded within a molding form, wherein the first and second adhering structures 216, 218 are molded within any one of various forms that can include, but are not limited to, injection molding forms, compression molding forms, blow molding forms, and other similar molding forms. During the process of forming the first and second adhering structures 216, 218, the expandable structural adhesive can be molded directly into the recesses 268 formed within the first and second adhering structures 216, 218.

Referring again to FIGS. 11 and 12, after the two-piece expandable reinforcement 210 is disposed within the cavity 262 of the frame joint 224, the paint cure process cures the expandable structural adhesive, such that the expandable structural adhesive is in the structural state 266 that substantially fills the cavity 262 around the two-piece expandable reinforcement 210. In this manner, the expandable structural adhesive serves as the primary connecting method for the first and second members 220, 222 of the frame joint 224, as well as other members that may form portions of the frame joint 224. It is contemplated that the cured expanding structural adhesives 260 of the first and second adhering structures 216, 218 remain separate to allow the two-piece expandable reinforcement 210 to move toward the distally-engaged position 234, in the event of a collision, as will be more fully described below.

Referring again to FIGS. 8-16, once the expandable structural adhesive is cured within the cavity 262 of the frame joint 224, the first and second adhering structures 216, 218 of the two-piece expandable reinforcement 210 are primarily held together through the primary connecting mechanism 250. In the various embodiments, the primary connecting mechanism 250 can include various conventional fasteners, connectors, and other coupling mechanisms that can include, but are not limited to, tabs, screws, bolts, hasps, clasps, and other various conventional fastening mechanisms. It is contemplated that the primary connecting mechanism 250 of the two-piece expandable reinforcement 210 is configured to retain the first and second adhering structures 216, 218 in the directly-engaged position 226, when typical operation loads and various low-level impact loads are placed upon the frame joint 224. In this manner, during general operation in various low-level impact conditions, the frame joint 224 remains substantially intact and the various members, including the first and second members 220, 222, of the frame joint 224, remain in a substantially fixed position relative to one another.

As illustrated in FIGS. 11-16, when a predetermined impact load is placed upon the vehicle frame 212, where the predetermined impact load may be the result of a moderate to large collision event, the predetermined impact force 232 can serve to overcome the primary connecting mechanism 250 holding together the first and second adhering structures 216, 218. In this manner, the predetermined impact force 232 causes the primary connecting mechanism 250 to disengage or otherwise fail, such that the first adhering structure 216 can disengage from the second adhering structure 218. Accordingly, the first and second adhering structures 216, 218 are substantially allowed to move away from one another, a limited and predetermined distance, toward the distally-engaged position 234. As the first and second adhering structures 216, 218 move toward the distally-engaged position 234, the first and second members 220, 222 of the frame joint 224, and potentially other members that form the frame joint 224 can also separate from one another. Accordingly, members of the frame joint 224 that are primarily connected to the first adhering structure 216 will generally move to the distally-engaged position 234 along with the first adhering structure 216. Similarly, those members of the frame joint 224 that are primarily adhered to the second adhering structure 218 will generally move to the distally-engaged position 234 along with the second adhering structure 218.

In the various embodiments, the types of collisions that are contemplated are side-type impacts. It is contemplated that the two-piece expandable reinforcement 210 can also be used to at least partially absorb other types of impacts as well. Such impacts can include, but are not limited by, roll-over impacts, crush-type impacts, front or rear impacts, diagonal impacts, as well as others.

It is contemplated that the primary connecting mechanism 250 can be adapted to withstand up to a predetermined separation load caused by the collision event. Once the separation load is surpassed, such as through the predetermined impact load, separating movement 280 between the first and second adhering structures 216, 218 is permitted due to the detachment or other failure of the primary connecting mechanism 250. Once such detachment or other failure occurs, a permissible amount of separating movement 280 occurs to the extent of the supplemental tether 228, which acts as a countermeasure to substantially prevent further separating movement 280 between the first and second adhesive structures beyond the distally-engaged position 234.

Referring again to FIGS. 12-16, as the first and second adhering structures 216, 218 reach the distally-engaged position 234, the supplemental tether 228 is fully extended and placed in the tensioned position 236 to substantially stop the separating movement 280 between the first and second adhering structures 216, 218. In this manner, while the first and second adhering structures 216, 218, as a result of the predetermined impact force 232, are no longer in direct contact, the supplemental tether 228 of the two-piece expandable reinforcement 210 substantially prevents total separation and maintains a supplemental engagement between the first and second adhering structures 216, 218. As such, some limited movement is afforded between the first and second adhering structures 216, 218, as well as the various members of the frame joint 224. This limited movement can assist the frame 212 of the vehicle 214 and the various frame joints 224 in absorbing at least a portion of the predetermined impact force 232 placed upon the frame 212 as a result of the collision event. It is contemplated that the distally-engaged position 234 can be located at various distances from the directly-engaged position 226. Such distances of the distally-engaged position 234 can be within the range of about 1" to about 10" of the directly engaged position. It is also contemplated that the distally-engaged position 234 can be less than about one inch from the directly-engaged position 226, so long as some limited movement is allowed between the first and second adhering structures 216, 218.

In the various embodiments, it is contemplated that the supplemental tether 228, as well as the distance from the directly-engaged position 226 that the first and second adhesive structures are allowed to separate to define the distally-engaged position 234, can be tuned based upon various design factors. Such design factors can include, but are not limited to, the location of the frame joint 224, the material of the frame 212, the type of vehicle, the size of the vehicle, the weight of the vehicle, and other various considerations involved in the design of a vehicle frame 212 and the vehicle 214 as a whole. By way of explanation, and not limitation, in situations where a frame joint 224 may be exposed to greater impact loads, the first and second adhering structures 216, 218 may be designed to separate farther from one another to reach the distally-engaged position 234. Greater potential displacement of the first and second adhering structures 216, 218 can, in various embodiments, serve to allow the frame 212 to absorb more of the impact forces. In this manner, greater amounts of the impact forces are absorbed so that less of the impact loads are permitted to transfer into the passenger cabin.

Referring again to FIGS. 7-16, during a collision event, various forces are transferred into the frame 212 and the frame joints 224. In order to absorb these various impact forces, including the predetermined impact force 232, various panels including, but not limited to, the roof panel 290, side panels 292, quarter panels 294, and others, can be designed to disengage and move a limited distance toward the distally-engaged position 234 in order to allow portions of the vehicle 214 and the vehicle frame 212 to deflect or crumple in a substantially predetermined direction and a substantially predetermined distance. Accordingly, where the two-piece expandable reinforcement 210 is disposed proximate a roof panel 290, during a collision event when the predetermined impact force 232 is transferred to the frame joint 224, the first and second adhering structures 216, 218 are allowed to move toward the distally-engaged position 234. In this manner, the roof panel 290, which can be adhered to the first adhering structure 216, is allowed to deflect in order to at least partially absorb the various impact forces. In various alternate embodiments, the two-piece expandable reinforcement 210 can be disposed within the B-pillar 296, or the A- or C-pillars 298, 300 in order to provide structural reinforcement to the vehicle frame 212 proximate the roof. It is also contemplated that the two-piece expandable reinforcement 210 can be located in other portions of a vehicle frame 212 to provide structural reinforcement to the front, sides, middle, undercarriage, quarter panels 294, or other regions of the vehicle frame 212. In addition to providing additional structure to these various portions of the vehicle 214 and the vehicle frame 212, the two-piece expandable reinforcement 210 also provides for selective disengagement of the first and second adhering structures 216, 218 to at least partially absorb forces experienced as a result of a collision event.

Referring again to FIGS. 10-14, in the various embodiments, the supplemental tether 228 can include a first rod 310 extending through at least a portion of the first adhering structure 216 and a second rod 312 that extends at least partially through the second adhering structure 218. A flexible member 314 can be configured to extend from the first rod 310 to the second rod 312 to form the supplemental tether 228 of the two-piece expandable reinforcement 210. It is contemplated that when the first and second adhering structures 216, 218 are positioned in the directly-engaged position 226, the flexible member 314 of the supplemental tether 228 is placed in the slack position 230, where the flexible member 314 is substantially idle. It is also contemplated that the first and second adhering structures 216, 218 can include cutouts 316 that define an interstitial space 318 between the first and second adhering structures 216, 218 to substantially contain the flexible member 314 when it is in the slack position 230. Once the predetermined impact force 232 is placed upon the frame joint 224 and the first and second adhering structures 216, 218 separate toward the distally-engaged position 234, the flexible member 314 of the supplemental tether 228 becomes fully extended such that the flexible member 314 is in a tensioned position 236 to substantially prevent further separating movement 280 between the first and second adhering structures 216, 218.

In the various embodiments, the first and second rods 310, 312 of the supplemental tether 228 can be steel, metallic, composite, combinations thereof or other rigid materials. In various alternate embodiments, structural protrusions defined within the first and second adhering structures 216, 218, hooks or other similar fasteners can also be used to connect with an end of the flexible member 314 such that the flexible member 314 can be disposed in the slack and tensioned positions 230, 236. It is contemplated that the flexible member 314 can be metal or plastic cable, straps, or other similar flexible member 314 that can be adapted to withstand moderate to high impact collision forces. In the various embodiments, it is also contemplated that the flexible member 314 of the supplemental tether 228 can include a substantially tear-proof material that is capable of withstanding the paint oven processing used to activate the expandable structural adhesive from the installation state 264 to the structural state 266. In the various embodiments, the number of rods and/or flexible members 314 can vary depending on the structural needs of the particular frame joint 224.

It is contemplated that when the first and second adhering structures 216, 218 are in the distally-engaged position 234, the supplemental tether 228 can substantially prevent further separation beyond this predetermined distance. It is also contemplated that the supplemental tether 228 can afford a limited amount of lateral movement between the first and second adhering structures 216, 218. In this manner, the various members of the frame joint 224 and adjacent body panels are also afforded some limited lateral movement as the first and second adhering structures 216, 218 are laterally and/or vertically displaced. In various embodiments, twisting movement between first and second adhering structures 216, 218 can also occur as these structures move to the distally-engaged position 234. The various multi-directional movements of the first and second adhering structures 216, 218 serve to allow the members of the vehicle frame 212 to at least partially absorb the impact forces exerted upon the vehicle 214 during an impact condition.

Referring again to FIGS. 8-16, in the various embodiments of the two-piece expandable reinforcement 210, where the first and second adhering structures 216, 218 are positioned proximate the roof panel 290 of the vehicle 214, the first and second adhering structures 216, 218 can be positioned above one another. As such, the first adhering structure 216 can correspond to an upper half of the two-piece expandable reinforcement 210 and the second adhering structure 218 can correspond to a lower half of the two-piece expandable reinforcement 210. In such an embodiment, as the first and second adhering structures 216, 218 move toward the distally-engaged position 234, the first and second adhering structures 216, 218 will move away from each other in a generally vertical direction. Although, as discussed above, lateral, twisting, tilting and other limited movements are also contemplated as the first and second adhering structures 216, 218 move toward the distally-engaged position 234. While the movement is described as the first and second adhering structures 216, 218 moving generally away from one another, it is also contemplated that one of the first and second adhering structures 216, 218 can remain in a substantially fixed position while the other of the first and second adhering structures 216, 218 can independently move in order to define the distally-engaged position 234 of the two-piece expandable reinforcement 210.

Figure 17:
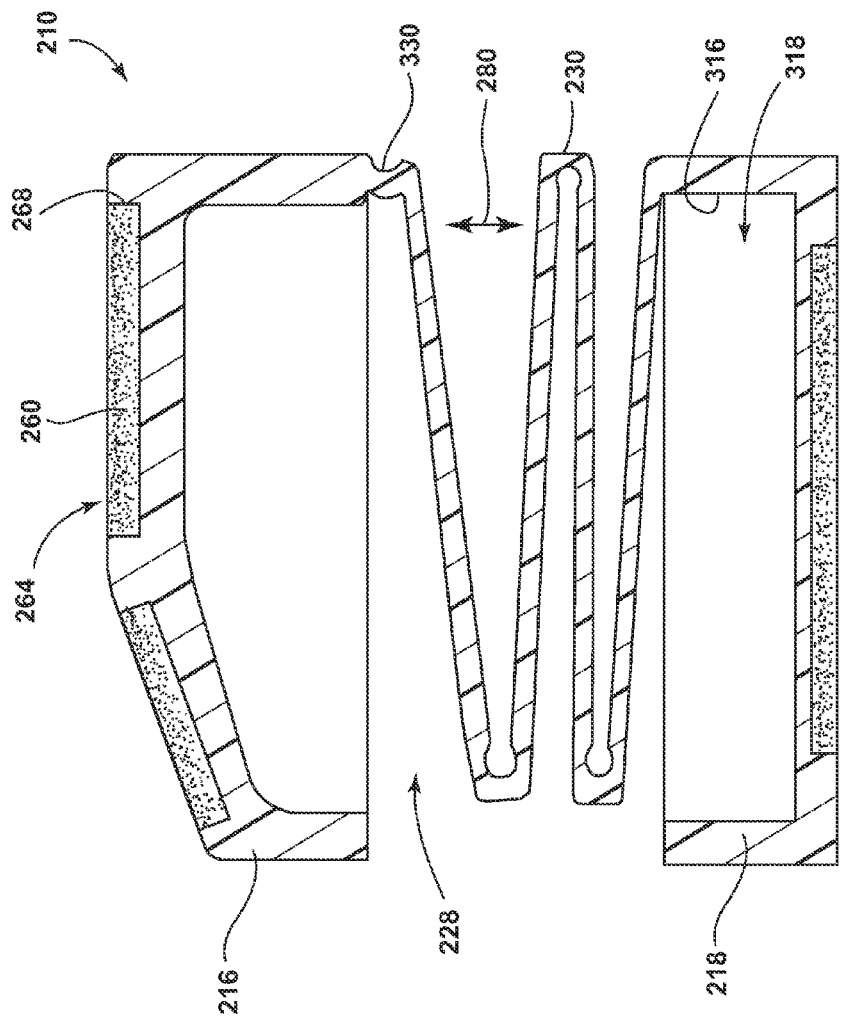
FIG. 17 is a schematic cross-sectional view of another alternative embodiment of the two-piece expandable reinforcement.
Figure 18:
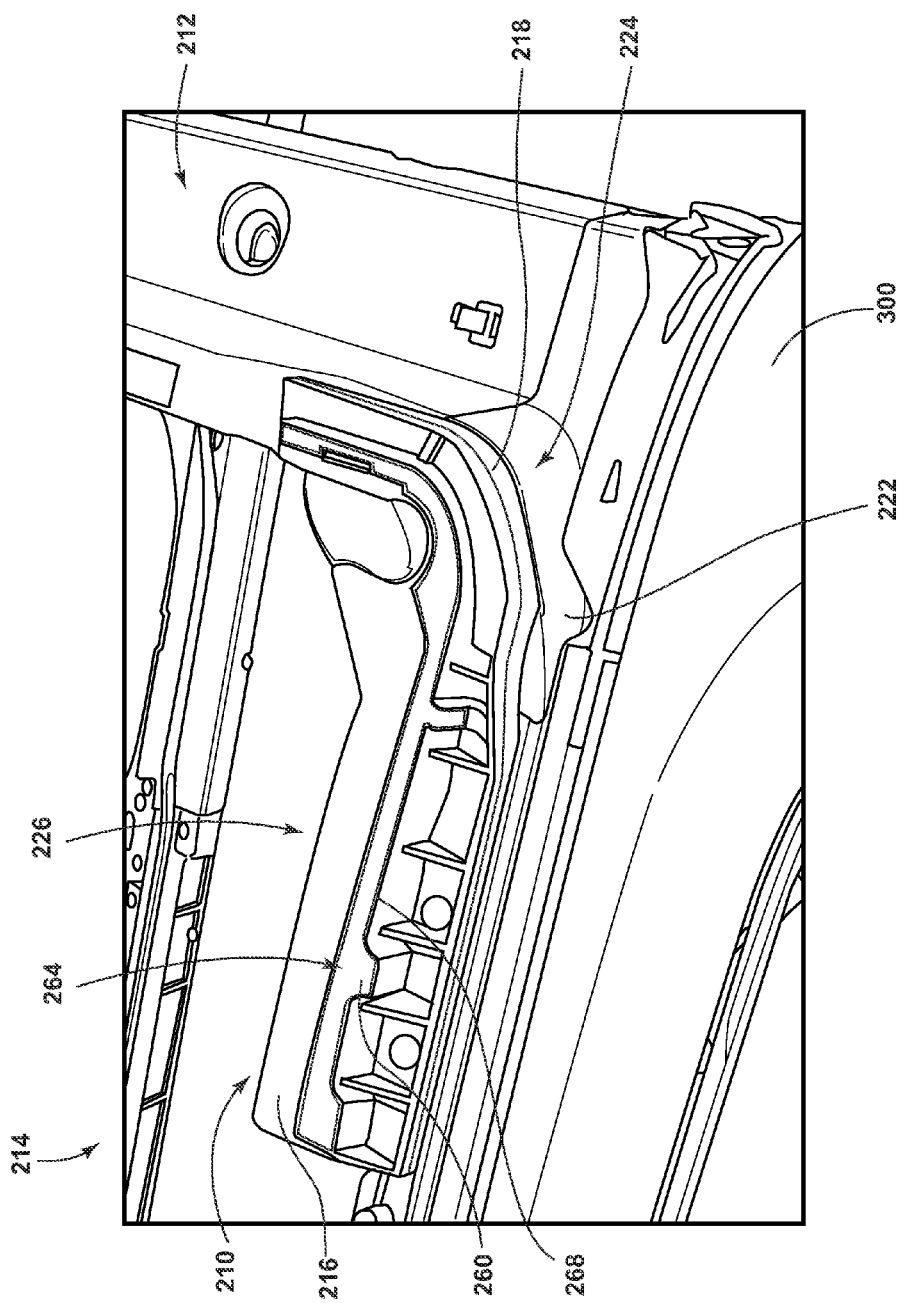
FIG. 18 is an enlarged top perspective view of the two-piece expandable reinforcement of FIG. 8 taken at area XVIII.

Referring now to FIG. 17, in various alternate embodiments, the supplemental tether 228 can include a flexible member 314 that is connected to and extends between the first and second adhering structures 216, 218. In such an embodiment, the flexible member 314 can be hingedly connected to the first and second adhering structures 216, 218. As the first and second adhering structures 216, 218 move toward the distally-engaged position 234, the hinged flexible member 314 can substantially unfold until the first and second adhering structures 216, 218 reach the distally-engaged position 234, at which time the flexible member 314 of the supplemental tether 228 reaches the tensioned position 236 to substantially prevent further separating movement 280 between the first and second adhering structures 216, 218. It is further contemplated that the flexible member 314 of the supplemental tether 228 can be integrally formed with the first and second adhering structures 216, 218 to form one or more living hinges 330. In such an embodiment, the flexible member 314, through the living hinges 330, can be folded into the interstitial space 318 defined between the first and second adhering structures 216, 218 when disposed in the directly-engaged position 226. It is also contemplated that separate hinges can be used to attach the flexible member 314 to the first and second adhering structures 216, 218.

Figure 19:
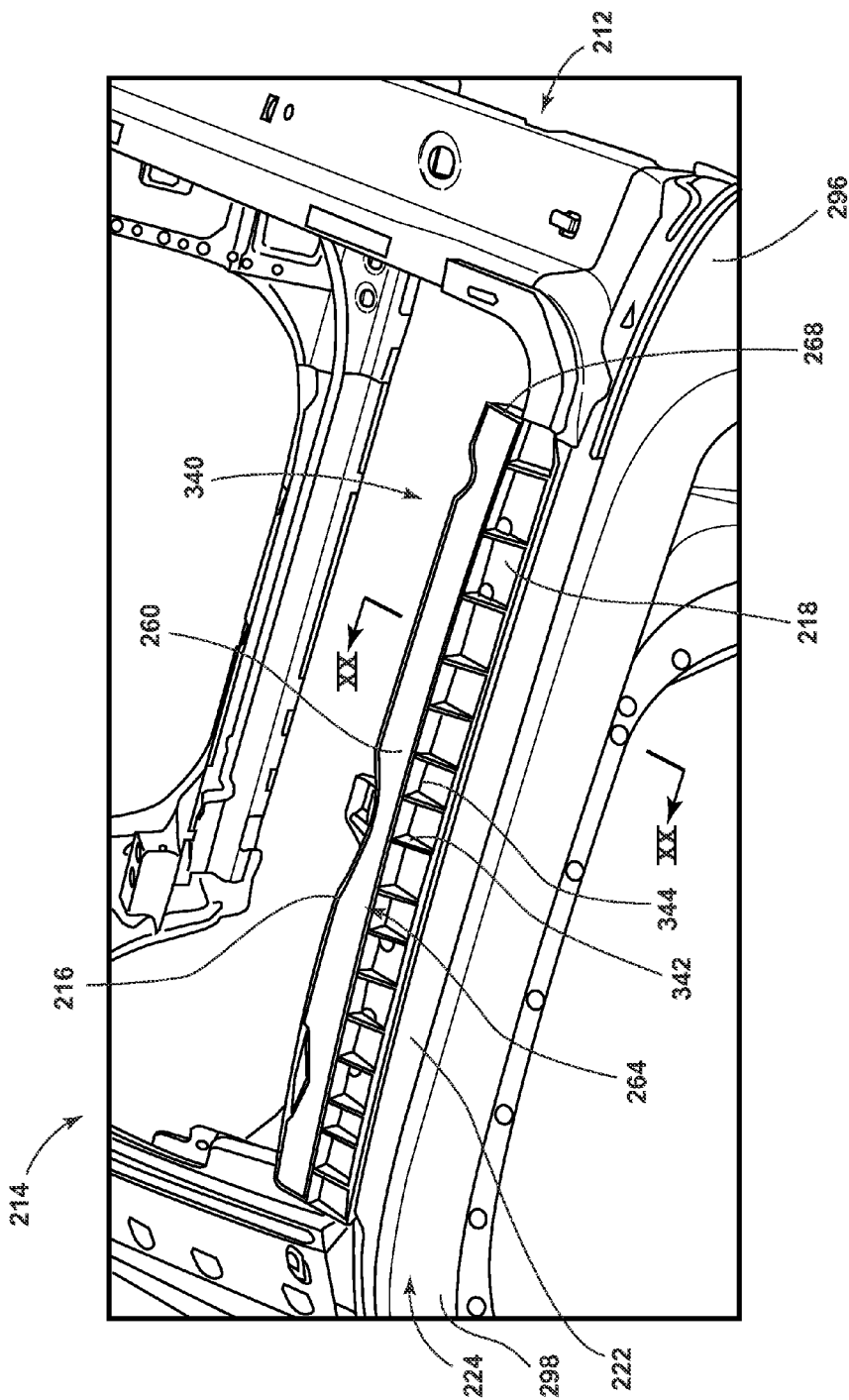
FIG. 19 is a top perspective view of another vehicle frame showing another alternative embodiment of the expandable reinforcement.
Figure 20:
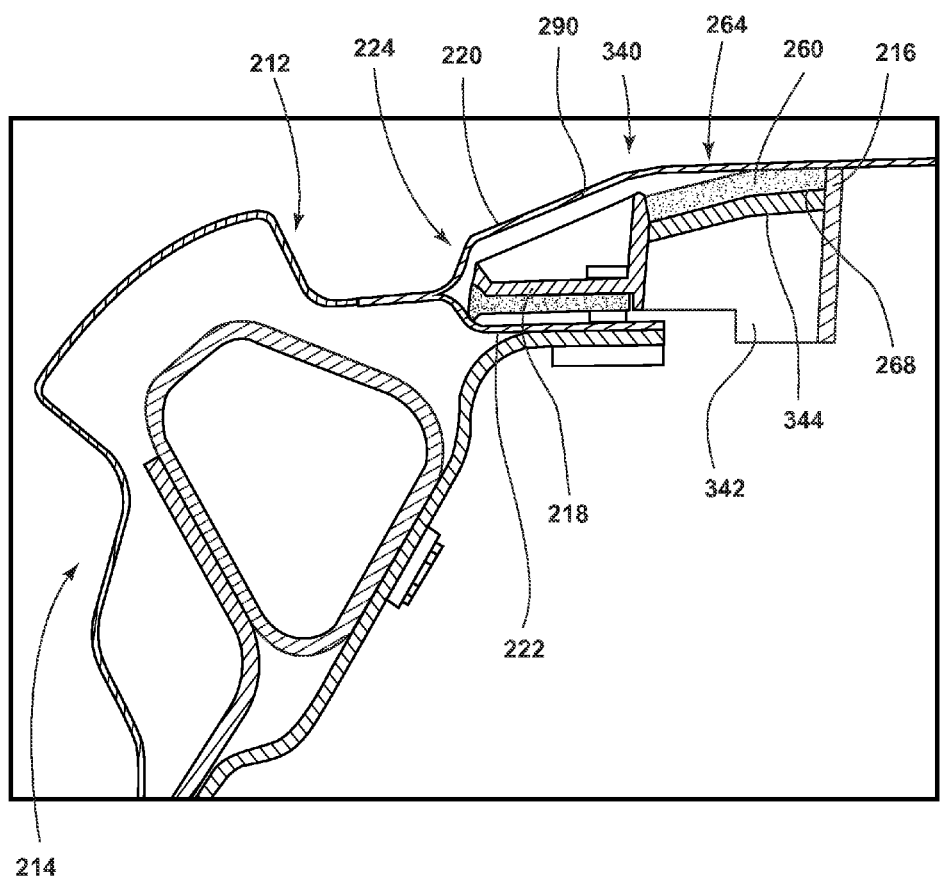
FIG. 20 is a cross-sectional view of the expandable reinforcement of FIG. 19 taken along line XX-XX.

Referring now to FIGS. 19 and 20, it is contemplated that the expandable reinforcement can include a single-piece expandable reinforcement 340 that stretches along the length of a structural member of a vehicle frame 212. By way of explanation, and not limitation, a single-piece expandable reinforcement 340 can be disposed between pillars, such as the A- and B-pillar 298, 296 or B- and C-pillar 296, 300, along the roofline of the frame 212 of the vehicle 214. Accordingly, the expandable reinforcement is adapted to provide additional structure to the entire length of the frame 212 between the various pillars of the frame 212. In such an embodiment, the single-piece expandable reinforcement 340 can be formed through the first and second adhering structures 216, 218 being fused together such that separating movement 280 of the first and second adhering structures 216, 218 is substantially limited. Each of the first and second adhering structures 216, 218 can include a plurality of internal fins 342 that are positioned generally perpendicular to the orientation of the structural member being reinforced. The internal fins 342 of the first and second adhering structures 216, 218 can be disposed within an elongated channel 344 of each of the first and second adhering structures 216, 218. Opposite the elongated channels 344 of the first and second adhering structures 216, 218, are the recesses 268 that receive the expandable structural adhesive for adhering the various members of the vehicle frame 212 together during the paint cure of the frame manufacturer process. As with previous embodiments, the expandable structural adhesive disposed within the recesses 268 of the first and second adhering structures 216, 218 can be co-molded within a single forming mold to create the single-piece expandable reinforcement 340. Such forming molds can include, but are not limited to, injection molds, compression molds, blow molds, and other various forming molds used to create molded structural components for vehicle frames 212.

In the various embodiments, it is contemplated that the first and second adhering structures 216, 218 or the single-piece expandable reinforcement 340 can be made of materials that can include, but are not limited by, nylon, plastic, metal, composite, combinations thereof, and other substantially formable materials that can be used to receive the expandable structural adhesive and which can also substantially withstand the various curing processes that the vehicle frame 212 is placed within during formation of the frame 212 of the vehicle 214.

It is also contemplated that the structure of each of the first and second adhesive structures can vary depending on the design needs of the two-piece or one-piece expanding reinforcement. As such, the first and second adhesive structures can be solid members, hollow members, include a honeycomb or other tessellated structure, can include various cavities, as well as having other similar interior structures.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle roof frame comprising:
   first and second adhering structures adhered to first and second members of a frame joint, respectively, the first and second adhering structures selectively connected to define a directly-engaged position; and
   a supplemental tether extending between the first and second adhering structures and defining a slack position when the first and second adhering structures are in the directly-engaged position, wherein when a predetermined impact force is applied to the frame joint, the first adhering structure and first member at least partially separate from the second adhering structure and second member toward a distally-engaged position, wherein the supplemental tether defines a tensioned position when the first and second adhering structures are in the distally-engaged position.

2. The vehicle roof frame of claim 1, wherein the supplemental tether defines a plurality of partially-extended positions as the first and second adhering structures move toward the distally-engaged position.

3. The vehicle roof frame of claim 1, further comprising:
   a primary connecting mechanism adapted to selectively retain the first and second adhering structures in the directly-engaged position, wherein the predetermined impact force causes the primary connecting mechanism to disengage the first and second adhering structures from the directly-engaged position.

4. The vehicle roof frame of claim 1, wherein the supplemental tether includes a first rod extending through the first adhering structure and a second rod extending through the second adhering structure and a flexible member extending from the first rod to the second rod.

5. The vehicle roof frame of claim 1, wherein the supplemental tether includes a flexible member hingedly connected to and extending between the first and second adhering structures, and wherein the flexible member includes at least one living hinge.

6. The vehicle roof frame of claim 1, wherein the first and second adhering structures are adhered to the first and second members by an expanding structural adhesive, wherein each of the first and second adhering structures includes at least one recess adapted to receive the expanding structural adhesive.

7. The vehicle roof frame of claim 6, wherein each of the first and second adhering structures are co-molded with the expanding structural adhesive.

8. The vehicle roof frame of claim 1, wherein the first and second adhering structures are nylon.

9. A vehicle frame comprising:
   a tether extending between first and second adhering structures selectively connected to define a directly-engaged position, wherein the tether defines a slack position; and
   frame members adhered to the first and second adhering structures, wherein when a predetermined impact force is applied to the frame members, the first and second adhering structures separate toward a distally-engaged position, wherein the tether is in a tensioned position.

10. The vehicle frame of claim 9, wherein the tether defines a plurality of partially-extended positions as the first and second adhering structures move toward the distally-engaged position.

11. The vehicle frame of claim 9, further comprising:
    a primary connecting mechanism adapted to selectively retain the first and second adhering structures in the directly-engaged position, wherein the predetermined impact force causes the primary connecting mechanism to disengage the first and second adhering structures from the directly-engaged position.

12. The vehicle frame of claim 9, wherein the tether includes a first rod extending through the first adhering structure and a second rod extending through the second adhering structure and a flexible member extending from the first rod to the second rod.

13. The vehicle frame of claim 9, wherein the tether includes a flexible member hingedly connected to and extending between the first and second adhering structures, and wherein the flexible member includes at least one living hinge.

14. The vehicle frame of claim 9, wherein the first and second adhering structures are adhered to the frame members by an expanding structural adhesive, wherein each of the first and second adhering structures includes at least one recess adapted to receive the expanding structural adhesive.

15. A vehicle roof frame comprising:
    first and second adhering structures adhered to first and second members of a frame joint, respectively, and selectively connected together to define a directly-engaged position, wherein the first and second adhering structures separate toward a predetermined distally-engaged position when a predetermined impact force is applied to the frame joint; and
    a tether that defines the predetermined distally-engaged position.

16. The vehicle roof frame of claim 15, wherein the tether defines a plurality of partially-extended positions as the first and second adhering structures move toward the distally-engaged position.

17. The vehicle roof frame of claim 15, further comprising:
    a primary connecting mechanism adapted to selectively retain the first and second adhering structures in the directly-engaged position, wherein the predetermined impact force causes the primary connecting mechanism to disengage the first and second adhering structures from the directly-engaged position.

18. The vehicle roof frame of claim 15, wherein the tether includes a first rod extending through the first adhering structure and a second rod extending through the second adhering structure and a flexible member extending from the first rod to the second rod.

19. The vehicle roof frame of claim 15, wherein the tether includes a flexible member hingedly connected to and extending between the first and second adhering structures, and wherein the flexible member includes at least one living hinge.

20. The vehicle roof frame of claim 15, wherein the first and second adhering structures are adhered to the first and second members by an expanding structural adhesive, wherein each of the first and second adhering structures includes at least one recess adapted to receive the expanding structural adhesive.

\* \* \* \* \*